April 26, 1966    V. S. MOSINSKIS    3,247,907
BLADE FOLDING MECHANISM FOR ROTARY WING AIRCRAFT
Filed Sept. 18, 1963    4 Sheets-Sheet 1
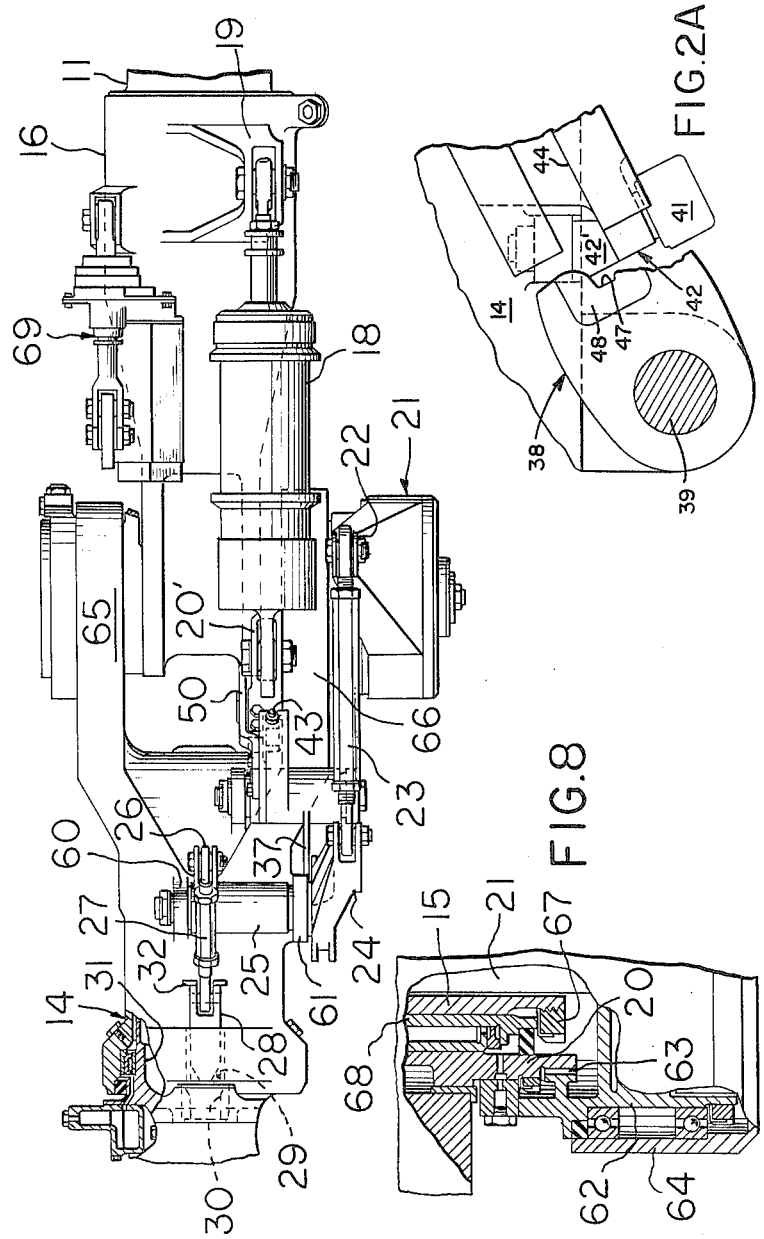
INVENTOR.
VICTOR S. MOSINSKIS
BY
HIS ATTORNEYS

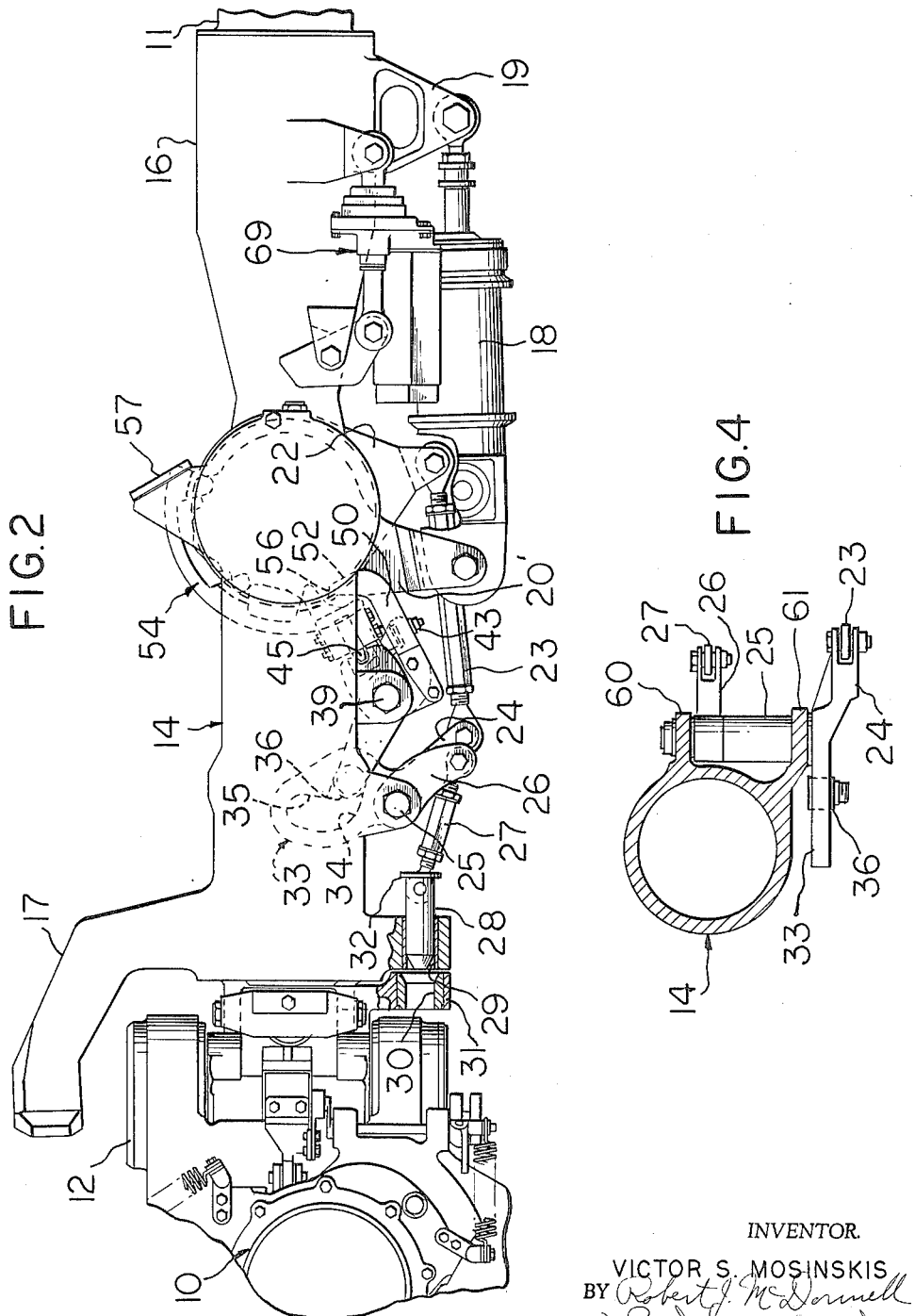

INVENTOR.
VICTOR S. MOSINSKIS
HIS ATTORNEYS

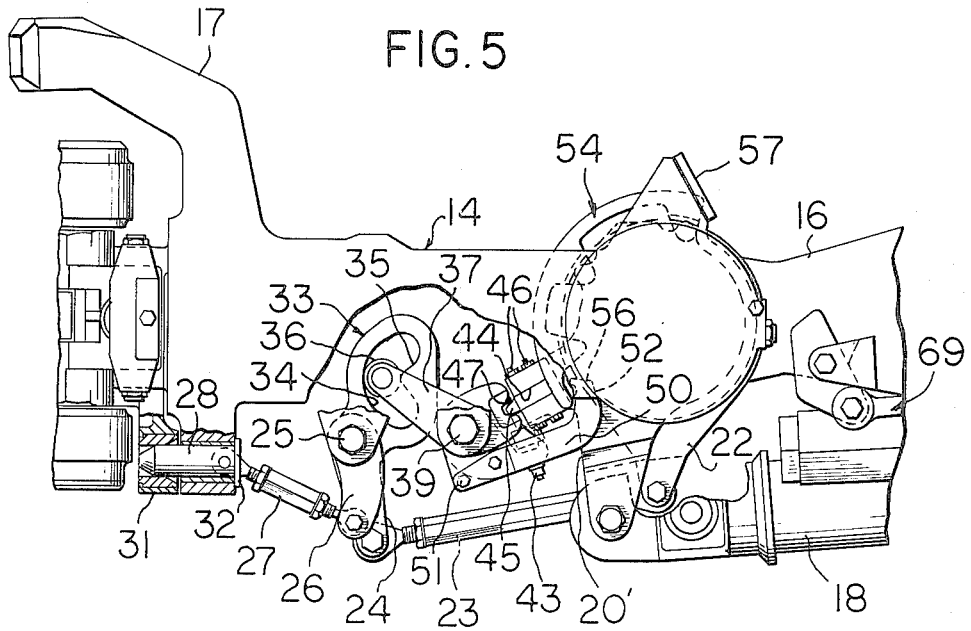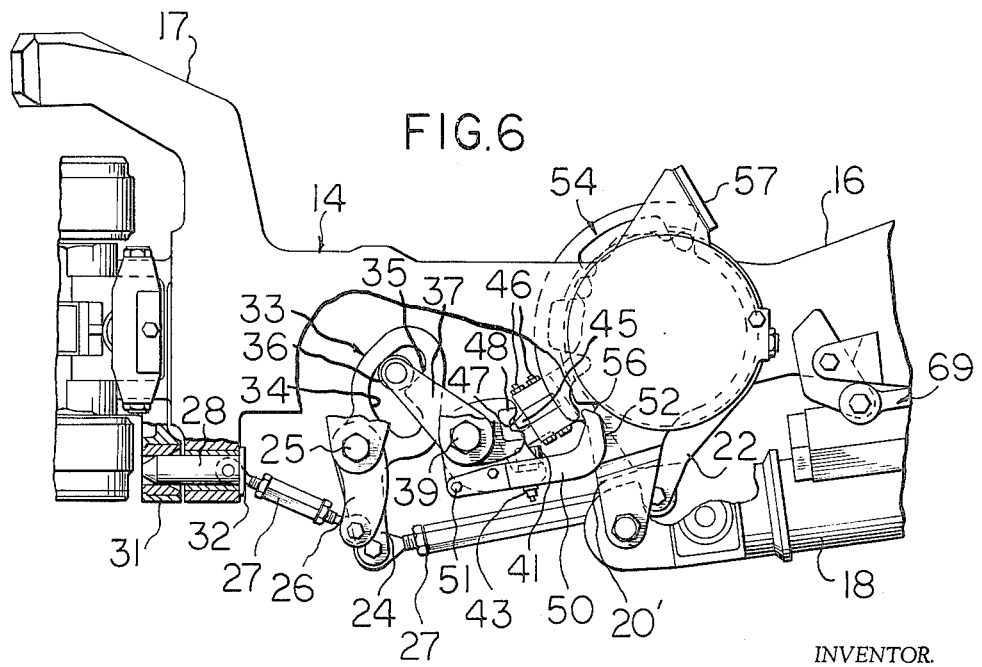

United States Patent Office 3,247,907
Patented Apr. 26, 1966

3,247,907
BLADE FOLDING MECHANISM FOR ROTARY
WING AIRCRAFT
Victor S. Mosinskis, Springfield, Pa., assignor to The
Boeing Company, Seattle, Wash., a corporation of
Delaware
Filed Sept. 18, 1963, Ser. No. 309,809
20 Claims. (Cl. 170—160.12)

This invention relates to a rotary wing aircraft and, more particularly, to a folding mechanism for folding and unfolding rotor blades of a rotary wing aircraft.

When parking rotary wing aircraft such as helicopters, it is often desirable to fold the rotor blades over the helicopter fuselage. This operation greatly reduces the amount of helicopter storage and handling area, which is required during stowing and parking maneuvers. Furthermore, folding of the rotor blades is desirable from a safety standpoint since the helicopter is less susceptible to damage by wind, particularly gusts, when it is parked. Additionally, when helicopters are employed on surface ships, such as aircraft carriers, folding of the rotor blades enables transport of the helicopter to and from the hanger deck by elevators.

The folding of helicopter rotor blades has previously been accomplished both manually and by power blade folding mechanism. Prior to manually folding the rotor blades, it has been necessary to dephase the rotors, insert pitch lock pins, and disengage blade dampers. Environmental conditions, such as the combined velocities of headwinds and an aircraft carrier, when a helicopter is disposed thereon, further complicate this manual procedure.

Various types of power blade folding apparatuses have been employed in the past. These have included devices in which separate actuators were utilized for each of the operations that is performed in the manual operation. Another type of power blade folding apparatus, which has been used previously, was one in which the actuating mechanism, due to its configuration, created inherent aerodynamic problems during the rotor blade's operation in flight. Some power blade folding mechanisms have previously utilized additional hinge structure about which the folded portion was pivoted.

The present invention satisfactorily solves these problems by employing a compact actuating mechanism, which is streamlined so as not to create aerodynamic problems when the rotor blade is operating during flight. The present invention also eliminates the need of additional hinge structure, which adds undesired weight to the rotor blade, by utilizing the lead-lag hinge as the pivot point for the folding operation. The use of the single hinge structure for both lead-lag and blade folding reduces the frontal area of the rotor hub. This invention also utilizes a single actuating mechanism to perform all the desired functions in the proper sequence.

Rotor blade pitch control is achieved by rotation of the rotor blade about its longitudinal axis. Accordingly, as a rotor blade is folded about its fold point, the weight of the blade tends to cause the same rotational motion in the unfolded blade structure as is caused by blade pitch control movements. Therefore, if the blade pitch control is not locked, the outer extremity of the blade may strike the ground, helicopter fuselage, or other proximate objects. Thus, it is important to lock the pitch of the blade prior to folding to avoid damage to pitch linkage, the rotor blade, and objects in rotor blade proximity. Additionally, such rotational movement will tend to feed back into the pitch linkage and the swash plate rotor controls and could cause damage thereto because of the large moment arm of the blade weight.

Accordingly, an object of the present invention is to provide an uncomplicated mechanism that operates to automatically and rapidly fold and unfold a portion of a helicopter rotor blade.

Another object of this invention is to provide a folding mechanism for automatically folding the rotor blade of a helicopter after first locking the pitch of the blade automatically.

A further object of this invention is to provide a rotor blade folding mechanism for pivoting the rotor blade about its lead-lag hinge.

Other objects of this invention will be readily perceived from the following description, claims, and drawings.

This invention relates to a mechanism for folding and unfolding rotor blade means of a rotary wing aircraft about a lead-lag hinge of the rotor blade means. The mechanism comprises actuating means that have a plurality of outputs. Control means is employed for causing a first of the outputs to be operative and a second of the outputs to be inoperative when the rotor blade means is in its unfolded position. Locking means, which is connected to the control means, is employed for locking the rotor blade means to prevent a change of pitch. The first output is connected to the locking means to move the locking means to its locking position. The second output is connected to the rotor blade means to move the rotor blade means about its lead-lag hinge to its folded position. After the locking means has locked the rotor blade means, the control means, which is connected to the locking means, renders the first output inoperative whereby the actuating means moves the rotor blade means to its folded position.

This invention also relates to a mechanism for moving a pivoted portion of a rotor blade means of a rotary wing aircraft from an unfolded position in which the pivoted portion forms a continuation of a fixed portion of the rotor blade means. The mechanism includes a first output and a second output. Means is employed to control the first output and the second output whereby at least one of the outputs is always operative. In response to the first output, locking means lock the fixed portion against rotation about its axis to prevent a change of pitch. The control means is connected to the locking means whereby the first output is rendered inoperative after the locking means has locked the fixed portion against rotation about its axis so that the second output moves the pivoted portion of the rotor blade means to its folded position.

This invention further relates to a mechanism for folding and unfolding a rotor blade means of a rotary wing aircraft about a lead lag hinge of the rotor blade means. The mechanism comprises actuating means having first output means and second output means for exerting forces in opposite directions. Locking means is employed to lock the rotor blade means when the rotor blade means is in its unfolded position to prevent pitch change of the rotor blade means. The first output means and the locking means are connected by linkage means, which have means secured thereto for controlling the second output means to render it operative and inoperative. The first output means moves the locking means to its locking position through the connecting linkage means. The locking means has means to render the first output means inoperative after the locking means is in its locking position. The control means is actuated through the first output means to render the second output means operative after the locking means is in its locking position. The second output means is connected by suitable means to the rotor blade means whereby the second output means moves the rotor blade means from its unfolded position to its folded position when the second output means is rendered operative by the control means.

The attached drawings illustrate a preferred embodiment of the invention, in which:

FIGURE 1 is a side elevational view, partly in section, of a portion of a helicopter rotor blade embodying the blade folding mechanism of the present invention;

FIGURE 2 is a top plan view, partly in section, of the structure of FIGURE 1;

FIGURE 2A is an enlarged fragmentary plan view, partly in section, of a portion of the structure of FIGURE 2 with parts broken away and omitted for clarity purposes;

FIGURE 4 is a sectional view, partly in elevation, of a portion of the blade folding mechanism of FIGURE 1;

FIGURE 5 is a top plan view, similar to FIGURE 2, at a point during folding operations at which the blade pitch is already locked and the folding of the blade is beginning;

FIGURE 6 is a top plan view, similar to FIGURE 2, at a point during folding operations beyond that of FIGURE 5 in which the control mechanism is partially disengaged;

FIGURE 8 is a sectional view of a portion of the actuating mechanism of the present invention.

Figure 7:
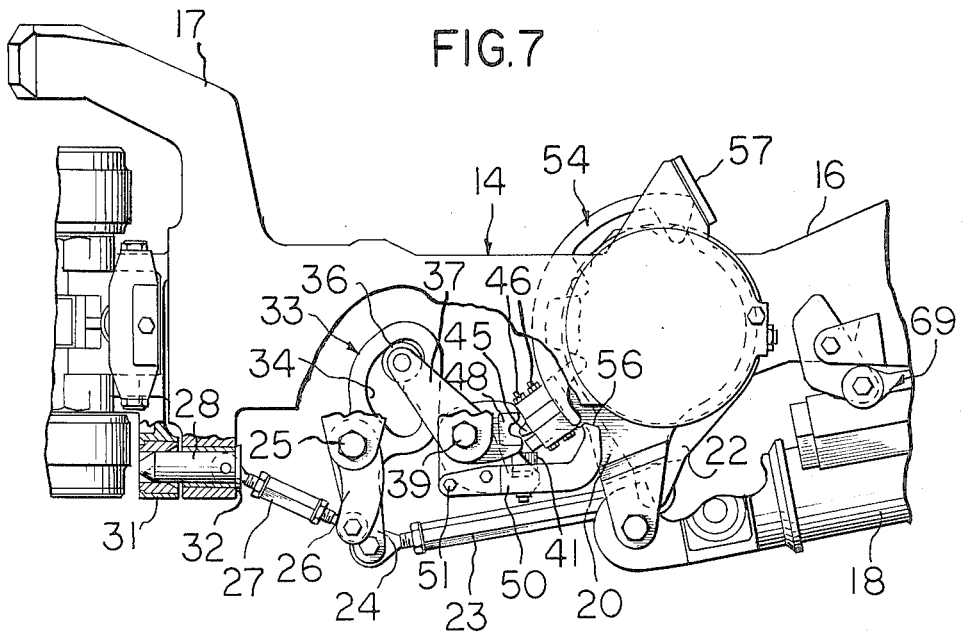
FIGURE 7 is a top plan view, similar to FIGURE 2, at a point during folding operations beyond that of FIGURE 6 in which the control mechanism is completely disengaged.

Referring to the drawings an dparticularly FIGURES 1 and 2, there is shown a rotor hub 10, which drives a plurality of blades (one shown at 11). It should be understood that synchronization means for phasing the folding of the blades in order to prevent blade interference is used but forms no part of the present invention. The blade 11 is connected to the rotor hub 10 through a horizontal pin 12, a pitch shaft 31, a pitch bearing housing 14, a vertical pin 15 (see FIGURE 8), and a socket 16.

The horizontal pin 12 forms a flap hinge that permits the blade 11 to flap in a generally vertical plane. The horizontal pin 12 is attached to both the rotor hub 10 and the pitch shaft 31. The pitch shaft 31 containing bearings is connected to the pitch bearing housing 14 by well-known tension-torsion straps whereby the housing 14, which surrounds a portion of the shaft 31, may rotate about the axis of the pitch shaft 31.

The pitch bearing housing 14 is connected to the vertical pin 15, which functions as a lead-lag hinge to allow the blade 11 to move transversely in a generally horizontal plane, through bifurcated arms 65 and 66, which surround the pin 15. The socket 16, which is disposed between bifurcated arms 65 and 66 of the housing 14, has a passage for receiving the pin 15 whereby there is a unitary connection.

A pitch arm 17 is connected to the pitch bearing housing 14 for controlling the pitch of the blade 11. Thus, movement of the pitch arm 17 by the pilot through a suitable mechanism (not shown) results in the pitch of the blade 11 being varied as desired.

A damper 18 is employed to limit movements of the blade 11 about the axis of the vertical pin 15. One end of the damper 18 is pivotally connected to a bracket 19, which preferably is formed integral with the socket 16. The other end of the damper 18 is connected to an arm 20' of a torque plate 20, which is driven through suitable mechanism by an actuator 21. The axis of the actuator 21 is disposed coaxially with the axis of the vertical pin 15 and forms a streamlined configuration therewith.

The actuator 21 is a package unit comprising a reversible electric motor and a gear train. The actuator 21 has an essentially inverted mushroom shape to permit easy mounting and removal of the actuator 21 from the interior of the vertical pin 15. The vertical pin 15 is an annular member, which is held in position by a pair of lock nuts (one shown at 67 in FIGURE 8) threaded on its ends and engaging against surrounding annular spacers (one shown at 68 in FIGURE 8), which abut against the socket 16. The actuator 21 is secured to the vertical pin 15 by suitable means (not shown) such as flanges and bolts.

The motor of the actuator 21 is mounted so that the motor shaft may rotate driving either gear train housing 62 or rotatable housing 64 with respect to each other depending on which is restrained from rotation. The gear housing 62 of the actuator 21 is arranged to drive the torque plate 20. The rotatable housing 64 of the actuator 21 is disposed to drive an actuator arm 22. When either the torque plate 20 or the actuator arm 22 is held from rotation, the other becomes the rotating member.

The gear train housing 62 is splined to the torque plate 20 through splines 63, which act to transmit the torque generated by the motor of the actuator 21 and passed through the gear train. Since the only drive connection is through the splines 63, the actuator 21 is readily removable from the interior of the vertical pin 15 when the mounting bolts are removed.

The actuator 21 includes the rotatable housing 64, which connects the motor shaft of the actuator 21 with the actuator arm 22. The arm 22 is preferably formed integral with the housing 64. The arm 22 is connected to a shaft 25, which is rotatably mounted in bearings 60 and 61 on the pitch bearing housing 14, through a link 23 and an arm 24.

The housing 64 is arranged to be rotatable with respect to the gear train housing 62 whereby either moves while the other is stationary. Thus, if the torque plate 20 is prevented from rotation by the arm 20', the housing 64 becomes the rotating member to drive the actuator arm 22. If the actuator arm 22 is restrained to prevent rotation of the housing 64, the gear train housing 63 becomes the rotating member to drive the torque plate 20. Since the details of the actuator 21 do not form a part of the present invention, they will not be described. The actuator 21 may be similar to the type of actuator shown and described in U.S. Patent No. 2,944,444 to Burns.

Whenever the motor of the actuator 21 is energized, the arm 20' of the torque plate 20 and the actuator arm 22 tend to exert approximately equal and opposite torques. Both the torque arm 20' and the actuator arm 22 are designed to apply torque in planes substantially perpendicular to the pivotal axis of the vertical pin 15. Thus, the torque of the torque arm 20' tends to act parallel but opposite to the rotational torque of the actuator arm 22. In this manner, when the torque arm 20' or the actuator arm 22 is held stationary, the other is a moving member. Accordingly, if the actuator arm 22 is held stationary, the torque arm 20' becomes a movable member. Conversely, if the torque arm 20' is held stationary, the actuator arm 22 becomes a movable member.

When the arm 22 of the actuator 21 is driven clockwise, as viewed from above, clockwise rotation is imparted to the rotatable shaft 25 through the link 23 and the arm 24, which is secured to the rotatable shaft 25. The shaft 25 has a second arm 26 secured thereto for rotation therewith. The arm 26 is pivotally secured to a link 27, which has its other end pivotally connected to a pitch lock pin 28.

When the blade 11 is in its unfolded condition, the pitch lock pin 28 is disposed in a bushing 29 (see FIGURE 2) in the pitch bearing housing 14. However, when the arm 22 rotates the shaft 25, the pitch lock pin 28 is advanced through a bushing 30, which is disposed in a passage in a part of the pitch shaft 31. Since the pitch shaft 31 is not rotatable about the pitch axis of the pitch bearing housing 14, the pitch housing 14 is locked to the pitch shaft 31 to thereby lock the pitch of the blade 11.

Advancement of the pitch lock pin 28 into the bushing 30 is limited by a flange 32, which is mounted on the lock pin 28. When the flange 32 engages against a wall of the pitch bearing housing 14 adjacent the bushing 29, further movement of the arm 22, the linkage connecting the arm 22 to the shaft 25, and the linkage connecting the shaft 25 to the lock pin 28 is prevented. Thus, at the time when the flange 32 contacts the pitch bearing housing 14, the arm 22 of the actuator 21 ceases to be a movable member and becomes a stationary member.

A cam 33, which is preferably integral with the arm 24, is secured to the shaft 25 for rotation therewith. Accordingly, when the shaft 25 rotates clockwise due to the clockwise movement of the arm 22 of the actuator 21, the cam 33 also rotates clockwise with the axis of the shaft 25 serving as the point of rotation.

Figure 3:
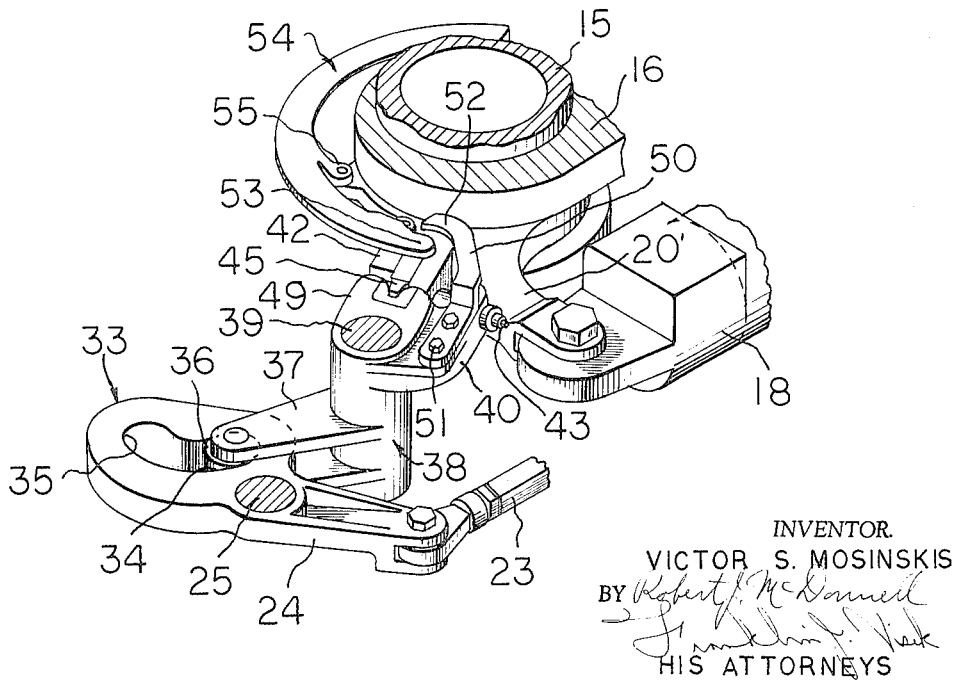
FIGURE 3 is a schematic view of a portion of the structure of FIGURE 1 with the actuating unit removed.

As seen in FIGURE 2 and 3, the cam 33 has a first cam portion 34 and a second cam portion 35. The cam portions 34 and 35 provide cam action with a cam roller or follower 36, which is mounted between a bifurcated arm 37 of a housing 38. It should be understood that the housing 38 and its associated parts along with the flange 32, which abuts against the pitch bearing housing 14 to stop the arm 22 from driving, control the amount and time that the actuator arm 22 and the torque arm 20' are allowed to drive.

The housing 38 is rotatably mounted on a shaft 39, which is supported on the pitch bearing housing 14 by arms extending from the housing. A locking arm 40, which is integral with the housing 38, has a self-aligning shoe 41 (see FIGURE 7) mounted thereon for abutting and clamping against a projection 42 of the torque plate 20. The arm 40 includes adjusting means in the form of shims for adjusting the abutment of the shoe 41 against the projection 42, which abuts against a stop 42' on the pitch bearing housing 14.

As may be best seen by reference to FIGURES 5 and 6, the projection 42 has a groove 44 therein in which a gear tooth 45 is mounted. The gear tooth 45 is secured in the groove 44 by fastening means, such as bolts 46, which traverse the projection 42 and the groove 44. The gear tooth 45 mates with a notch 47 in a removable member 48, which is mounted in a holder 49 of the housing 38 by suitable means (not shown).

When the blade 11 is in an unfolded or flight position, one face of the projection 42 of the torque plate 20 abuts the stop 42' on the pitch bearing housing 14. The self-aligning shoe 41 of the arm 40 abuts the opposite face of the projection 42. Shims, inserted between the self-aligning shoe 41 and the arm 40, insure that there is no play between these abutting surfaces. The result is that there can be no vibration between these parts.

A bolt 43, which passes through the arm 40 into the shoe 41, provides the means for mounting both the self-aligning shoe 41 and the shims therebetween. Thus, there is no requirement that there be an extremely close tolerance between the gear tooth 45 and the notch 47. Any clearances between these interfitting parts will not result in vibration since the locking arm 40 presses against the projection 42, which bears against the stop 42' on the pitch bearing housing 14.

The housing 38 has a lock lever 50 mounted thereon and secured thereto by fastening means, such as bolts 51. The lock lever 50 terminates in a lateral projection 52 (see FIGURES 2 and 3), which is adapted to cooperate with a flange 53 on an arcuate plate 54, which is secured to the torque plate 20 by fastening means, such as bolts 55. The flange 53 of the arcuate plate 54 and the lateral projection 52 of the lock lever 50 remain in spaced relation to each other until the roller 36 passes the cam "knee," which is the joinder of the cam portions 34 and 35. Then, the arcuate plate 54 cooperates with the lock lever 50 to insure that the roller 36 remains positioned in the portion 35 of the cam 33 as the blade 11 is folded.

Considering the operation of the blade-folding mechanism of this invention, it should be understood that FIGURES 1 and 2 illustrate the position of the blade-folding mechanism when the rotor blade 11 is in its unfolded condition and prepared for flight. In this position of the rotor blade, the pitch lock pin 28 is withdrawn from the bushing 30 in the pitch shaft 31 for unlocking the blade pitch controls. Additionally, the gear tooth 45 is mated with the notch 47 of the holder 49. The housing 38 is prevented from rotation by the cam portion 34 bearing against the roller 36 of the bifurcated arm 37. With the housing 38 restrained from rotating, the arm 40 is locked to insure that there can be no blade folding as explained hereinbelow.

When the blade 11 is in flight condition and the actuator 21 is energized for folding the blade, the actuator arm 22 is the movable actuator member. Since rotation of the housing 38 is restricted by the cam portion 34, the arm 40 holds the torque plate 20 from rotating and thereby prevents the torque arm 20' from driving the blade socket 16.

Accordingly, when the blade 11 is in flight condition and the actuator 21 is energized, the actuator arm 22 rotationally drives the shaft 25 clockwise through the link 23 and the arm 24. Of course, the cam 33 also rotates clockwise to cause the cam portion 34 to rotate and reposition the roller 36 with respect to the cam portion 34 without imparting any rotational force to the housing 38. The rotation of the shaft 25 moves the arm 26, which is secured thereto, and the link 27, which is attached to the pitch lock pin 28. As the actuator arm 22 is driven clockwise, the pitch lock pin 28 is axially driven through the bushings 29 and 30. When the pitch lock pin 28 is advanced into the bushing 30, the pitch bearing housing 14 is locked from movement with respect to the pitch shaft 31 to thereby lock the pitch of the blade 11.

As the pitch lock pin 28 advances through the bushing 30, its progress therethrough is stopped by engagement of the flange 32 against the pitch bearing housing 14. When the flange 32 engages the pitch bearing housing 14, further clockwise rotation of the arm 22, the shaft 25, and the cam 33 is prevented. At this time, the actuator arm 22 ceases to be the movable member and becomes the stationary member.

The configurations of the cam portions 34 and 35 are chosen so that coaction of the roller 36 therewith is synchronized with the operation of the flange 32 and the pitch lock pin 28. That is, when the roller 36 nears the end of the cam portion 34 and the beginning of the cam portion 35, the pitch lock pin 28 has locked the pitch of the blade 11 and the flange 32 is approaching the pitch bearing housing 14. At this time, the torque arm 20' begins to phase in as the position of the cam portion 34 with respect to the roller 36 permits slight rotational movement of the housing 38 about the shaft 39.

When the roller 36 rounds the cam "knee," the flange 32 abuts against the wall of the pitch bearing housing 14 to render the actuator arm 22 inoperative. At this time, the cam roller 36 is entering the cam portion 35, which permits free rotation of the housing 38 about the shaft 39. FIGURE 5 illustrates the relative position of the housing 38 and the components thereof at this point of the blade-folding operation.

After the roller 36 has rounded the cam "knee," the actuator drive is only through the torque arm 20.' Thus, at this time, the torque arm 20' becomes the driving member and the actuator arm 22 becomes the stationary member.

In the operation of the blade-folding mechanism thus far, the arm 22 rotated until it was restrained by engagement of the flange 32 against the pitch bearing housing 14. During the first portion of the time that the arm 22 was free to roate, the torque arm 20' and consequently the blade socket 16 were held from rotation by the arm 40 of the housing 38 until the cam 33 was rotated sufficiently by the actuator arm 22 to allow the housing 38 to rotate and drive the cam roller 36. As long as the housing 38 cannot rotate, its arm 40, which clamps the torque plate projection 42 against a portion 42' of the pitch bearing housing 14, and the notch 47, which is engaged by the gear tooth 45, are prevented from rotating. However, as the roller 36 nears the end of the cam portion 34, the housing 38 is released and allows the torque arm 20' to rotate. Of course, the clockwise rotation of the housing 38 is limited until the roller 36 enters the cam portion 35. Since the actuator arm 22 is held from rotation by the flange 32, the torque arm 20' is free to rotate counter-clockwise and is the moving member driven by the actuator 21.

As the torque arm 20' and the blade socket 16, which is connected thereto, rotate counter-clockwise, the blade 11 begins to fold about its lead-lag hinge, which is the vertical pin 15. As the blade 11 folds, the torque plate projection 42, which is integral with the torque plate 20, rotates counterclockwise to cause the gear tooth 45 to drive the holder 49 and thereby rotate the housing 38 clockwise about the shaft 39. Clockwise rotation of the housing 38 causes the roller 36 to move along the cam portion 35. This movement is shown in FIGURE 6 wherein the disengagement of the gear tooth 45 from the housing 38 is approximately at its mid-point. Of course, rotation of the housing 38 causes the housing arm 40 and the lock lever 50 to similarly rotate and thereby permit substantially unencumbered counter-clockwise rotation of the torque plate 20 and its projection 42.

The gear tooth 45 rotates the housing 38 until the gear tooth 45 leaves the notch 47 of the holder 49. This complete disengagement of the gear tooth 45 from the housing 38 is illustrated in FIGURE 7. However, as clearly shown in FIGURE 7, the cam roller 36 has not reached the end of the cam portion 35 when the gear tooth 45 is completely disengaged from the housing 38.

After the gear tooth 45 leaves the notch 47, the continued rotation of the blade 11 about the axis of the vertical pin 15 results in the flange 53 of the lock plate 54 contacting the lateral projection 52 of the lock lever 50, which is attached to the housing 38. As the lateral projection 52 is nudged by the flange 53 of the plate 54, the housing 38 is rotated a small additional amount. This slight additional rotation drives the cam roller 36 to the end of the cam portion 35 and causes the notch 47 to rotate so as to assume a more open position. This facilitates re-engagement of the gear tooth 45 when the blade 11 is unfolded.

The slight rotation imparted to the housing 38 by the contact of the lateral projection 52 with the flange 53 of the plate 54 positions a slide surface 56 of the lock lever 50. In this manner, the slide surface 56 is positioned to slidably contact the peripheral edges of the plate 54 as the blade socket 16 is rotated. This sliding contact locks the housing 38 from rotation and assures that the notch 47 will remain in its open position to readmit the gear tooth 45 therein. Since it is only the contact of the lateral projection 52, which is particularly wear-inducing, the lock plate 54 including its flange 53 may be constructed of a light and economical material such as aluminum, for example.

After the contact of the lateral projection 52 of the lock lever 50 with the arcuate lock plate 54, the blade 11 is free to complete its rotation to its folded position. The fold position and the extent of pivotal rotation of the blade socket 16 is determined by engagement of a portion of an actuating mechanism 69 on the blade socket 16 with a stop 57, which is mounted on the pitch bearing housing 14 (see FIGURE 2). When the blade socket 16 strikes the stop 57, the torque arm 20' continues to drive until it compresses the damper 18 to the point where the blade 11 will be captured between the compressed damper 18 and the stop 57. It should be understood that the blade socket 16 may be stopped in either of two positions by the stop 57 depending on the portion of the actuating mechanism 69, which does not form a part of this invention, that engages the stop 57.

When it is desired to accomplish an unfold cycle, the actuator 21 is again energized. Of course, during an unfold cycle, the actuator drive members (the torque arm 20' and the actuator arm 22) again exert substantially equal and opposite torques. However, each exerts torque in a direction opposite to the direction in which it provided torque during the fold cycle.

When the blade 11 is in its folded position, the actuator arm 22 is held from driving because the roller 36 bears against the cam portion 35 to prevent the cam 33 and the shaft 25 from rotating. With the shaft 25 and the cam 33 incapable of rotation, the actuator arm 22 cannot rotate. Thus, the torque arm 20' is the movable actuator member and rotates the damper 18, which causes the blade 11 to rotate about the axis of the vertical pin 15 in a clockwise direction to return the blade 11 to its flight and unfolded position.

Rotation of the torque plate 20 also rotates the lock plate 54, which is secured thereto, to disengage the slide surface 56 of the lock lever 50 from engagement with the plate 54. Prior to this, the gear tooth 45, which is secured to the projection 42 of the torque plate 20, is driven into the notch 47 of the housing 38. With the gear tooth 45 engaged in the notch 47, continued rotation of the torque plate 20 in a clockwise direction causes the housing 38 to be driven counter-clockwise about the shaft 39. The counter-clockwise rotation of the housing 38 returns the cam roller 36 to the cam "knee" adjoining the cam portions 34 and 35.

At this time, the cam 33 is unlocked and the shaft 25 is free for rotation since the cam 33 is capable of rotation. The torque arm 20' has reached the end of its clockwise rotation since the projection 42 is now abutting the stop 42' on the pitch housing 14 and, therefore, the torque arm 20' can travel no further. The actuator arm 22, which was prevented from moving in a counter-clockwise direction because the cam 33 was locked, is now about to rotate due to the fact that the cam 33 is free to rotate.

Actuator drive through the torque arm 20' is completely phased out when the blade 11 has completed its unfold movements and is in a flight position wherein the folded or pivoted portion constitutes a continuation of the fixed portion. It should be understood that the rotor blade structure includes both the pitch housing 14, which is considered the fixed portion, and the blade 11 and the socket 16, which are considered the folded or pivoted portion, since both portions are driven by the hub 10.

When the blade 11 has completed its unfold movement, the gear tooth 45 has mated with the notch 47 and has rotated the housing 38 so that the arm 40 of the housing 38 is seated against the projection 42, which is seated against the stop 42' of the pitch bearing housing 14. The cam 33 locks these members in this position. This, as has been mentioned previously, prevents any further clockwise rotation of the blade 11. Of course, this stops any further movement of the torque arm 20' since it is attempting to drive the blade clockwise about the axis of the vertical pin 15. This rotation of the housing 38 by the gear tooth 45 also drives the roller 36 from the cam portion 35 to the cam portion 34.

The final stages of the unfold cycle are completed by the actuator arm 22, which is being driven in a counter-clockwise direction by the actuator 21 during the unfolding cycle. The actuator arm 22 rotates the shaft 25 counter-clockwise through the link 23 and the arm 24. Since the shaft 25 is connected to the pitch lock pin 28 through the arm 26 and the link 27, counter-clockwise rotation of the shaft 25 causes the pitch lock pin 28 to be withdrawn from the bushing 30 in the pitch shaft 31. This withdrawal of the pitch lock pin 28 disengages the lock of the blade pitch and permits the blade 11 to be free for pitch settings. At the same time, the cam 33 rotates counter-clockwise since it is integral with the arm 24 and secured to the shaft 25. This counter-clockwise movement of the cam 33 causes the cam portion 34 to rotate and position the clamp roller 36 at an extremity of the cam portion 34, which is remote from the cam portion 35.

When the roller 36 is positioned in the extremity of the cam portion 34, the cam 33 is restrained from further counter-clockwise rotation to stop the actuator arm 22 from any further driving during the unfold cycle. This position of the roller 36 and the cam portion 34 also restricts rotational movement of the housing 38 which assures, through the clamping action of the shoe 41, the projection 42 and the pitch housing stop 42' comprising part of a clamp assembly, that the torque arm 20' is fixed during normal lead-lag movements of the blade 11.

Since the notch 47 is subjected to high wear whereas the remainder of the holder 49 is not so exposed, the member 48 is formed of a hard material, such as stainless steel, while the remainder of the housing 38 may be formed of a softer material. Of course, the entire housing 38 could be formed of the hard material if it were desired to eliminate the removable member 48.

While the present invention has been described with respect to a single blade on a rotor hub, it should be understood that one or more of the other blades on the rotor hub 10 may employ the mechanism of the present invention or a different blade folding structure, if desired. Furthermore, it should be understood that the present invention may be utilized on a blade or blades of each of a plurality of rotor hubs on a helicopter such as in a coaxial or tandem arrangement, for example.

While the present invention has described the articulation of the rotor blade as being provided by the flap hinge and the lead-lag hinge, it should be understood that other devices may be so employed to produce the articulation. In accordance therewith, the power blade folding mechanism of this invention is capable of utilization for folding rotor blades associated with such other types of articulation devices.

An advantage of this invention is that it reduces the over-all weight of the blade following mechanism and, thereby, the weight of the helicopter by eliminating an extra pin about which the blade folds. A further advantage of this invention is that the use of a lead-lag damper for maintaining the blade in its folded position reduces the amount of added weight created by the blade folding mechanism. Another advantage of this invention is that all steps in either blade folding or unfolding are carried out automatically by a single actuator mechanism. A still further advantage of this invention is that the profile drag forces, which are associated with the rotor hub assembly, are decreased due to a reduced frontal area because of the use of only a single pin for both lead-lag and folding.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A mechanism for folding and unfolding rotor blade means of a rotary wing aircraft about a lead-lag hinge of the rotor blade means comprising actuating means having a plurality of outputs, control means for causing a first of said outputs to be operative and a second of said outputs to be inoperative when said rotor blade means is in its unfolded position, and locking means for locking said rotor blade means when said rotor blade means is in its unfolded position to prevent a change of pitch, said first output being connected to said locking means to move said locking means to its locking position, said rotor blade means having means to control the lead-lag movements of said rotor blade means about its lead-lag hinge when said rotor blade means is in its unfolded position, said second output being connected to said last mentioned control means to move said rotor blade means about its lead-lag hinge to its folded position, said first mentioned control means being connected to said locking means, said first mentioned control means rendering said first output inoperative after said locking means has locked said rotor blade means whereby said actuating means moves said rotor blade means to its folded position.

2. A mechanism for folding and unfolding rotor blade means of a rotary wing aircraft about a lead-lag hinge of the rotor blade means comprising actuating means having a plurality of outputs, said actuating means having its axis coaxial with the axis of the lead-lag hinge, control means for causing a first of said outputs to be operative and a second of said outputs to be inoperative when said rotor blade means is in its unfolded position, and locking means for locking said rotor blade means when said rotor blade means is in its unfolded position to prevent a change of pitch, said first output being connected to said locking means to move said locking means to its locking position, said rotor blade means having means to control the lead-lag movements of said rotor blade means about its lead-lag hinge when said rotor blade means is in its unfolded position, said second output being connected to said last mentioned control means to move said rotor blade means about its lead-lag hinge to its folded position, said first mentioned control means being connected to said locking means, said first mentioned control means rendering said first output inoperative after said locking means has locked said rotor blade means whereby said actuating means moves said rotor blade means to its folded position.

3. A mechanism for moving a pivoted portion of a rotor blade means of a rotary wing aircraft from an unfolded position in which the pivoted portion forms a continuation of a fixed portion of said rotor blade means, said mechanism including a first output and a second output, means to control said first output and said second output whereby at least one of said outputs is always operative, locking means responsive to said first output for locking the fixed portion against rotation about its axis to prevent a change of pitch of the rotor blade means, and means connecting said control means to said locking means, said control means rendering the first output inoperative after said locking means has locked the fixed portion against rotation about its axis so that the second output moves the pivoted portion of said rotor blade means to its folded position.

4. A mechanism for moving a pivoted portion of a rotor blade means about its lead-lag hinge from an unfolded position in which the pivoted portion is a continuation of a fixed portion of the rotor blade means to a folded position, said mechanism including first linkage means to lock said fixed portion against rotation about its axis to prevent a change of pitch of the rotor blade means, and second linkage means connected to said pivoted portion to rotate the pivoted portion about the lead-lag hinge to the folded position of the rotor blade means, said second linkage means including means to dampen movements of said pivoted portion about the lead-lag hinge when the pivoted portion is in its unfolded position, said first linkage means including means to inactivate said second linkage means from rotating said pivoted portion until said fixed portion is locked against rotation about its axis to prevent pitch change of the rotor blade means.

5. A mechanism for folding and unfolding rotor blade means of a rotary wing aircraft about a lead-lag hinge of the rotor blade means comprising actuating means having first and second output means, means connecting said second output means to said rotor blade means, said second output connecting means having means to control the lead-lag movements of said rotor blade means about its lead-lag hinge when said rotor blade means is in its unfolded position, locking means to lock the rotor blade means when the rotor blade means is in its unfolded position to prevent pitch change of the rotor blade means, means connecting said first output means and said locking means whereby said locking means is moved to its locking position by said first output means, control means secured to said first output connecting means and movable by said first output means, said last mentioned control means rendering said second output means inoperative until pitch change of the rotor blade means is prevented by said locking means, said locking means having means to stop movement of said first output means after said locking means is in its locking position, said stop means cooperating with said last mentioned control means to render said first output means inoperative whereby said second output means moves said rotor blade means to its folded position.

6. A mechanism according to claim 5 in which said first output connecting means includes a shaft having said last mentioned control means secured thereto, first linkage means connecting the shaft and the first output means, and second linkage means connecting the locking means and the shaft.

7. A mechanism for folding and unfolding rotor blade means of a rotary wing aircraft about a lead-lag hinge of the rotor blade means comprising actuating means having first and second output means, said actuating means having its axis coaxial with the axis of the lead-lag hinge, means connecting said second output means to said rotor blade means, said second output connecting means having means to control the lead-lag movements of said rotor blade means about its lead-lag hinge when said rotor blade means is in its unfolded position, locking means to lock the rotor blade means when the rotor blade means is in its unfolded position to prevent pitch change of the rotor blade means, means connecting said first output means and said locking means whereby said locking means is moved to its locking position by said first output means, control means secured to said first output connecting means and movable by said first output means, said last mentioned control means rendering said second output means inoperative until pitch change of the rotor blade means is prevented by said locking means, said locking means having means to stop movement of said first output means after said locking means is in its locking osition, said stop means cooperating with said last mentioned control means to render said first output means inoperative whereby said second output means moves said rotor blade means to its folded position.

8. A mechanism for folding and unfolding rotor blade means of a rotary wing aircraft about a lead-lag hinge of the rotor blade means comprising actuating means having first and second output means, means connecting said second output means to said rotor blade means, said second output connecting means having means to control the lead-lag movements of said rotor blade means about its lead-lag hinge when said rotor blade means is in its unfolded position, locking means to lock the rotor blade means when the rotor blade means is in its unfolded position to prevent pitch change of the rotor blade means, means connecting said first output means and said locking means whereby said locking means is moved to its locking position by said first output means, control means secured to said first output connecting means and movable by said first output means, said last mentioned control means rendering said second output means inoperative until pitch change of the rotor blade means is prevented by said locking means, said locking means having means to stop movement of said first output means after said locking means is in its locking position whereby said second output means moves said rotor blade means to its folded position, and means to limit movement of said rotor blade means when the rotor blade means is being driven by said second output means from its unfolded position.

9. A mechanism for folding and unfolding rotor blade means of a rotary wing aircraft about a lead-lag hinge of the rotor blade means comprising actuating means having first output means and second output means for exerting forces in opposite directions, locking means to lock the rotor blade means when the rotor blade means is in its unfolded position to prevent pitch change of the rotor blade means, linkage means connecting said first output means and said locking means, means secured to said connecting linkage means for controlling said second output means to render it operative and inoperative, said first output means moving said locking means to its locking position through said connecting linkage means, said locking means including means to render said first output means inoperative after said locking means is in its locking position, said control means being actuated through said first output means to render said second output means operative after said locking means is in its locking position, and means connecting said second output means to said rotor blade means whereby said second output means moves said rotor blade means from its unfolded position to its folded position when the second output means is rendered operative by said control means, said second output connecting means having means to control the lead-lag movements of said rotor blade means about its lead-lag hinge when said rotor blade means is in its unfolded position.

10. A mechanism for folding and unfolding rotor blade means of a rotary wing aircraft about a lead-lag hinge of the rotor blade means comprising actuating means having first output means and second output means for exerting forces in opposite directions, said actuating means having its axis coaxial with the axis of the lead-lag hinge, locking means to lock the rotor blade means when the rotor blade means is in its unfolded position to prevent pitch change of the rotor blade means, linkage means connecting said first output means and said locking means, means secured to said connecting linkage means for controlling said second output means to render it operative and inoperative, said first output means moving said locking means to its locking position through said connecting linkage means, said locking means including means to render said first output means inoperative after said locking means is in its locking position, said control means being actuated through said first output means to render said second output means operative after said locking means is in its locking position, and means connecting said second output means to said rotor blade means whereby said second output means moves said rotor blade means from its unfolded position to its folded position when the second output means is rendered operative by said control means, said second output connecting means having means to control the lead-lag movements of said rotor blade means about its lead-lag hinge when said rotor blade means is in its unfolded position.

11. A mechanism for folding and unfolding rotor blade means of a rotary wing aircraft about a lead-lag hinge of the rotor blade means comprising actuating means having first output means and second output means for exerting forces in opposite directions, locking means to lock the rotor blade means when the rotor blade means is in its unfolded position to prevent pitch change of the rotor blade means, linkage means connecting said first output means and said locking means, means secured to said connecting linkage means for controlling said second output means to render it operative and inoperative, said first output means moving said locking means to its locking position through said connecting linkage means, said locking means including means to render said first output means inoperative after said locking means is in its locking position, said control means being actuated through said first output means to render said second output means operative after said locking means is in the locking position, said rotor blade means having means to dampen the movements of the rotor blade means about its lead-lag hinge when the rotor blade means is in its unfolded position, and means connecting said second output means to said dampening means whereby said second output means moves said rotor blade means from its unfolded position to its folded position when the second output means is rendered operative by said control means.

12. A mechanism for folding and unfolding rotor blade means of a rotary wing aircraft about a lead-lag hinge of the rotor blade means comprising actuating means having first output means and second output means for exerting forces in opposite directions, locking means to lock the rotor blade means when the rotor blade means is in its unfolded position to prevent pitch change of the rotor blade means, linkage means connecting said first output means and said locking means, means secured to said connecting linkage means for controlling said second output means to render it operative and inoperative, said first output means moving said locking means to its locking position through said connecting linkage means, said locking means including means to render said first output means inoperative after said locking means is in its locking position, said control means being actuated through said first output means to render said second output means operative after said locking means is in its locking position, said rotor blade means having means to dampen the movements of the rotor blade means about its lead-lag hinge when the rotor blade means is in its unfolded position, means connecting said second output means to said dampening means whereby the second output means moves said rotor blade means from its unfolded position to its folded position when the second output means is rendered operative by said control means, and means to limit movement of said rotor blade means when said second output means is operative.

13. A mechanism for folding and unfolding rotor blade means of a rotary wing aircraft about a lead-lag hinge of the rotor blade means comprising actuating means having first output means and second output means for exerting forces in opposite directions, locking means to lock the rotor blade means when the rotor blade means is in its unfolded position to prevent pitch change of the rotor blade means, linkage means connecting said first output means and said locking means, said connecting linkage means including a shaft, first link means connecting said first output means to said shaft, second link means connecting said shaft to said locking means, means secured to said shaft for controlling said second output means to render it operative and inoperative, said first output means moving said locking means to its locking position through said connecting linkage means, said locking means including means to render said first output means inoperative after said locking means is in its locking position, said control means being positioned by said first output means to render said second output means operative after said locking means is in its locking position, and means connecting said second output means to said rotor blade means whereby the second output means moves said rotor blade means from its unfolded position to its folded position when the second output means is rendered operative by said control means, said second output connecting means having means to control the lead-lag movements of said rotor blade means about its lead-lag hinge when said rotor blade means is in its unfolded position.

14. A mechanism for folding and unfolding rotor blade means of a rotary wing aircraft about a lead-lag hinge of the rotor blade means comprising actuating means having first output means and second output means for exerting forces in opposite directions, said actuating means having its axis coaxial with the axis of the lead-lag hinge, locking means to lock the rotor blade means when the rotor blade means is in its unfolded position to prevent pitch change of the rotor blade means, linkage means connecting said first output means and said locking means, said connecting linkage means including a shaft, first link means connecting said first output means to said shaft, second link means connecting said shaft to said locking means, means secured to said shaft for controlling said second output means to render it operative and inoperative, said first output means moving said locking means to its locking position through said connecting linkage means, said locking means including means to render said first output means inoperative after said locking means is in its locking position, said control means being positioned by said first output means to render said second output means operative after said locking means is in its locking position, and means connecting said second output means to said rotor blade means whereby the second output means moves said rotor blade means from its unfolded position to its folded position when the second output means is rendered operative by said control means, said second output connecting means having means to control the lead-lag movements of said rotor blade means about its lead-lag hinge when said rotor blade means is in its unfolded position.

15. A mechanism for folding and unfolding rotor blade means of a rotary wing aircraft about a lead-lag hinge of the rotor blade means comprising actuating means having first output means and second output means for exerting forces in opposite directions, locking means to lock the rotor blade means when the rotor blade means is in its unfolded position to prevent pitch change of the rotor blade means, linkage means connecting said first output means and said locking means, said connecting linkage means including a shaft, first link means connecting said first output means to said shaft, second link means connecting said shaft to said locking means, means secured to said shaft for controlling said second output means to render it operative and inoperative, said first output means moving said locking means to its locking position through said connecting linkage means, said locking means including means to render said first output means inoperative after said locking means is in its locking position, said control means being positioned by said first output means to render said second output means operative after said locking means is in its locking position, said rotor blade means having means to dampen the movements of the rotor blade means about its lead-lag hinge when the rotor blade means is in its unfolded position, and means connecting said second output means to said dampening means whereby said second output means moves said rotor blade means from its unfolded position to its folded position when the second output means is rendered operative by said control means.

16. A mechanism for folding and unfolding rotor blade means of a rotary wing aircraft about a lead-lag hinge of the rotor blade means comprising actuating means having first output means and second output means for exerting forces in opposite directions, locking means to lock the rotor blade means when the rotor blade means is in its unfolded position to prevent pitch change of the rotor blade means, linkage means connecting said first output means and said locking means, said connecting linkage means including a rotatably mounted shaft, first link means connecting said first output means to said shaft, second link means connecting said shaft to said locking means, means for controlling said second output means to render it operative and inoperative, said control means including cam means secured to said shaft for rotation therewith, follower means cooperating with said cam means whereby said follower means is moved by said cam means, said follower means including means to render said second output means inoperative when said follower means is coacting with a first portion of said cam means and the locking means is in an unlocked position, said rendering means of said follower means allowing said second output means always to be operative when said follower means is coacting with a second portion of said cam means, said first output means moving said locking means to its locking position through said connecting linkage means, said locking means including means to render said first output means inoperative after said locking means is in its locking position, said cam means being positioned by said first output means to cause said second portion of said cam means to coact with said follower means when said first output means is rendered inoperative by said rendering means of said locking means, and means connecting said second output means to said rotor blade means whereby the second output means moves said rotor blade means from its unfolded position to its folded position when the second output means is rendered operative by said control means, said second output connecting means having means to control the lead-lag movements of said rotor blade means about its lead-lag hinge when said rotor blade means is in its unfolded position.

17. A mechanism for folding and unfolding rotor blade means of a rotary wing aircraft about a lead-lag hinge of the rotor blade means comprising actuating means having first output means and second output means for exerting forces in opposite directions, said actuating means having its axis coaxial with the axis of the lead-lag hinge, locking means to lock the rotor blade means when the rotor blade means is in its unfolded position to prevent pitch change of the rotor blade means, linkage means connecting said first output means and said locking means, said connecting linkage means including a rotatably mounted shaft, first link means connecting said first output means to said shaft, second link means connecting said shaft to said locking means, means for controlling said second output means to render it operative and inoperative, said control means including cam means secured to said shaft for rotation therewith, follower means cooperating with said cam means whereby said follower means is moved by said cam means, said follower means including means to render said second output means inoperative when said follower means is coacting with a first portion of said cam means and the locking means is in an unlocked position, said rendering means of said follower means allowing said second output means always to be operative when said follower means is coacting with a second portion of said cam means, said first output means moving said locking means to its locking position through said connecting linkage means, said locking means including means to render said first output means inoperative after said locking means is in its locking position, said cam means being positioned by said first output means to cause said second portion of said cam means to coact with said follower means when said first output means is rendered inoperative by said rendering means of said locking means, and means connecting said second output means to said rotor blade means whereby the second output means moves said rotor blade means from its unfolded position to its folded position when the second output means is rendered operative by said control means, said second output connecting means having means to control the lead-lag movements of said rotor blade means about its lead-lag hinge when said rotor blade means is in its unfolded position.

18. A mechanism for folding and unfolding rotor blade means of a rotary wing aircraft about a lead-lag hinge of the rotor blade means comprising actuating means having first output means and second output means for exerting forces in opposite directions, locking means to lock the rotor blade means when the rotor blade means is in its unfolded position to prevent pitch change of the rotor blade means, linkage means connecting said first output means and said locking means, said connecting linkage means including a rotatably mounted shaft, first link means connecting said first output means to said shaft, second link means connecting said shaft to said locking means, means for controlling said second output means to render it operative and inoperative, said control means including cam means secured to said shaft for rotation therewith, follower means cooperating with said cam means whereby said follower means is moved by said cam means, said follower means including means to render said second output means inoperative when said follower means is coacting with a first portion of said cam means and the locking means is in an unlocked position, said rendering means of said follower means allowing said second output means always to be operative when said follower means is coacting with a second portion of said cam means, said first output means moving said locking means to its locking position through said connecting linkage means, said locking means including means to render said first output means inoperative after said locking means is in its locking position, said cam means being positioned by said first output means to cause said second portion of said cam means to coact with said follower means when said first output means is rendered inoperative by said rendering means of said locking means, said rotor blade means having means to dampen the movements of the rotor blade means about its lead-lag hinge when the rotor blade means is in its unfolded position, and means connecting said second output means to said dampening means whereby said second output means moves said rotor blade means from its unfolded position to its folded position when the second output means is rendered operative by said control means.

19. A mechanism for folding and unfolding rotor blade means of a rotary wing aircraft about a lead-lag hinge of the rotor blade means comprising actuating means having first output means and second output means for exerting forces in opposite directions, locking means to lock the rotor blade means when the rotor blade means is in its unfolded position to prevent pitch change of the rotor blade means, linkage means connecting said first output means and said locking means, said connecting linkage means including a rotatably mounted shaft, first link means connecting said first output means to said shaft, second link means connecting said shaft to said locking means, means for controlling said second output means to render it operative and inoperative, said control means including cam means secured to said shaft for rotation therewith, rotatable means, roller means connecting said cam means and said rotatable means, said roller means being adapted to coact with said cam means for determining the position of said rotatable means, said rotatable means having means cooperating with said second output means to render said second output means inoperative when said roller means is coacting with a first portion of said cam means and the locking means is in an unlocked position, said rendering means of said rotatable means allowing said second output means always to be operative when said roller means is coacting with a second portion of said cam means, said first output means moving said locking means to its locking position through said connecting linkage mechanism, said locking means including means to render said first output means inoperative after said locking means is in its locking position, said cam means being positioned by said first output means to render said second output means operative after said locking means is in its locking position and to cause coaction of said second portion of said cam means with said roller means when said first output means is rendered inoperative by said rendering means of said locking means, and means connecting said second output means to said rotor blade means whereby the second output means moves said rotor blade means from its unfolded position to its folded position when the second output means is rendered operative by said control means, said second output connecting means having means to control the lead-lag movements of said rotor blade means about its lead-lag hinge when said rotor blade means is in its unfolded position.

20. A mechanism for folding and unfolding rotor blade means of a rotary wing aircraft about a lead-lag hinge of the rotor blade means comprising actuating means having first output means and second output means for exerting forces in opposite directions, locking means to lock the rotor blade means when the rotor blade means is in its unfolded position to prevent pitch change of the rotor blade means, linkage means connecting said first output means and said locking means, said connecting linkage means including a rotatably mounted shaft, first link means connecting said first output means to said shaft, second link means connecting said shaft to said locking means, means for controlling said second output means to render it operative and inoperative, said control means including cam means secured to said shaft for rotation therewith, said cam means having a first cam portion and a second cam portion extending at an angle from said first cam portion, rotatable means, roller means connecting said cam means and said rotatable means, said roller means being adapted to coact with said cam means for determining the position of said rotatable means, said rotatable means having means cooperating with said second output means to cause said second output means to be inoperative when said roller means is coacting with a portion of the first cam portion of said cam means and to allow said second output means always to be operative when said roller means is coacting with the second cam portion of said cam means, said first output means moving said locking means to its locking position through said connecting linkage mechanism, said locking means including means ot render said first output means inoperative after said locking means is in its locking position, said cam means being positioned by said first output means to render said second output means operative after said locking means is in its locking position and to cause coaction of said second cam portion with said roller means when said first output means is rendered inoperative by said rendering means, said rotor blade means having means to dampen the movements of the rotor blade means about its leading hinge when the rotor blade means is in its unfolded position, and means connecting said second output means to said dampening means whereby said second output means moves said rotor blade means from its unfolded position to its folded position when the second output means is rendered operative by said control means.

References Cited by the Examiner

UNITED STATES PATENTS 3,153,455  10/1964  Mosinskis _____ 170—160.12

FOREIGN PATENTS 852,841  11/1960  Great Britain.

MARK NEWMAN, *Primary Examiner.*

JULIUS E. WEST, *Examiner.*

W. E. BURNS, *Assistant Examiner.*